United States Patent
Fischer et al.

(10) Patent No.: US 11,372,421 B2
(45) Date of Patent: Jun. 28, 2022

(54) NAVIGATION SYSTEM

(71) Applicant: SICK AG, Waldkirch/Breisgau (DE)

(72) Inventors: Jonas Fischer, Wyhl (DE); Andreas Behrens, Emmendingen (DE); Cornel Rombach, Denzlingen (DE)

(73) Assignee: SICK AG, Waldkirch/Breisgau (DE)

( * ) Notice: Subject to any disclaimer, the term of this patent is extended or adjusted under 35 U.S.C. 154(b) by 500 days.

(21) Appl. No.: 16/434,802

(22) Filed: Jun. 7, 2019

(65) Prior Publication Data
US 2019/0377356 A1   Dec. 12, 2019

(30) Foreign Application Priority Data

Jun. 8, 2018   (EP) ..................................... 18176794

(51) Int. Cl.
*G06K 7/14* (2006.01)
*G06K 19/06* (2006.01)
*G05D 1/02* (2020.01)

(52) U.S. Cl.
CPC ......... *G05D 1/0234* (2013.01); *G06K 7/1413* (2013.01); *G06K 19/06028* (2013.01); *G05D 2201/02* (2013.01)

(58) Field of Classification Search
CPC ........... G05B 19/41895; G05D 1/0234; G05D 1/0291; G05D 1/0274
USPC ..................... 701/23, 1–4, 19, 438; 235/375, 235/472.01–472.3, 462.08
See application file for complete search history.

(56) References Cited

U.S. PATENT DOCUMENTS

| 2007/0276558 A1* | 11/2007 | Kim ..................... G05D 1/0236 701/23 |
| 2011/0010023 A1* | 1/2011 | Kunzig ................ G05D 1/0234 701/2 |
| 2016/0313740 A1 | 10/2016 | Deutscher et al. |

(Continued)

FOREIGN PATENT DOCUMENTS

| DE | 102012020973 A1 | 4/2013 |
| DE | 102016119793 A1 | 4/2018 |
| EP | 2626671 A1 | 8/2013 |

OTHER PUBLICATIONS

Search Report dated Apr. 25, 2019 issued in corresponding European Application No. 18176794.8.
(Continued)

*Primary Examiner* — Edwyn Labaze
(74) *Attorney, Agent, or Firm* — Nath, Goldberg & Meyer; Jerald L. Meyer

(57) ABSTRACT

A navigation system for an automated guided vehicle comprises a set of marking elements which are to be arranged in grid form on the floor and in which navigation information is encoded; a sensor device to be arranged at the automated guided vehicle for reading navigation data from the marking elements; and an evaluation device connected to the sensor device for generating control signals for the automated guided vehicle with reference to read navigation data. Each of the marking elements has at least two graphical code patterns that are each designed as one-dimensional code patterns and comprise a code applied along a scanning direction, with the scanning directions of the at least two graphical code patterns being aligned offset from one another by an angular offset.

16 Claims, 3 Drawing Sheets

(56) References Cited

U.S. PATENT DOCUMENTS

2020/0174107 A1* 6/2020 Briggs .................... G06T 7/73

OTHER PUBLICATIONS

Michael Banik: "Navigation application in the building via two-dimensional barcode recognition", Jan. 1, 2014, XP055524449.
Robin Brügger et al: "Annular Barcodes", IMVS Fokus Report 2015, Jan. 23, 2015, XP055524749, Heidelberg, ISBN: 978-3-89864-457-0.
Leo Hartmann et al: "Robot Vision for Space Applications Schedule and Proceedings Table of Contents Satellite Pose Acquisition and Tracking with Variable Dimensional Local Shape Development of a Scaled Ground Testbed for Lidar-based Pose Estimation End-point Control of a Flexible Structure Mounted Manipulator Based on W", Jan. 1, 2005, XP055136470.
Beck Jong Hwan et al: "Vision based distance measurement system using two-dimensional barcode for mobile robot", 2017 4th International Conference on Computer Applications and Information Processing Technology (CAIPT), IEEE, Aug. 8, 2017, pp. 1-4, XP033332109.
Edwin Olson: "AprilTag: A robust and flexible visual fiducial system", Robotics and Automation (ICRA), 2011, IEEE International Conference ON, IEEE, May 9, 2011, pp. 3400-3407, XP032033438.

* cited by examiner

NAVIGATION SYSTEM

The present invention relates to a navigation system for an automated guided vehicle, having a set of marking elements which are to be arranged in grid form on the floor and in which navigation information is encoded, having a sensor device to be arranged at the automated guided vehicle for reading navigation information from the marking elements, and having an evaluation device connected to the sensor device for generating control signals for the automated guided vehicle with reference to read navigation information.

Such navigation systems are generally called "grid navigation systems" and serve for the orientation of automatically traveling guided vehicles within an activity zone defined by the grid such as a building or a commercial unit. The read navigation information enables a targeted movement from a starting point to an end point for the automated guided vehicle. Depending on the application, the navigation information can comprise spatial coordinates, direction indications, numerals, characterizing comments such as "Shelf 1" and the like. All kinds of automatically guided vehicles such as AGVs, AGCs, forklift trucks, lifting equipment and the like should be covered by the term "automated guided vehicle" in the present disclosure.

The marking elements can each comprise an RFID transponder (radio frequency identification transponder) that is embedded into the floor. For example, such marking elements can be fastened in drilled floor recesses using a resin. A corresponding RFID reader is to be provided at the automated guided vehicle in such systems. RFID-based grid navigation systems are in particular associated with relatively high costs for large activity zones.

Alternatively, respective two-dimensional graphical code patterns such as matrix codes can be applied to the marking elements. Readers for two-dimensional graphical code patterns are relatively expensive, however.

Possibilities are therefore being looked for in the technical sector to provide simpler and less expensive navigation systems for automated guided vehicles.

This object is satisfied by a navigation system having the features of claim 1.

The invention provides that each of the marking elements has at least two graphical code patterns that are each designed as one-dimensional code patterns and comprise a code applied along a scanning direction, with the scanning directions of the at least two graphical code patterns being aligned offset from one another by an angular offset.

A sensor device for reading one-dimensional graphical code patterns is substantially less expensive than a sensor device for reading two-dimensional graphical code patterns. A use of individual one-dimensional code patterns as exclusive position markings in grid navigation systems is, however, hindered by the circumstance that the automated guided vehicle can approach a marking element from any desire directions, but that the scanning direction predefined by the sensor device may not deviate as desired from the scanning direction of the code pattern. A considerably misaligned code pattern can generally not be correctly recognized.

Since in accordance with the invention each marking element comprises a plurality of differently aligned one-dimensional code patterns, the sensor device can switch to a different code pattern to read the navigation information in the event of too great a misalignment. A secure positional determination of the automated guided vehicle is thus possible despite the use of an inexpensive one-dimensional reader.

The codes of the one-dimensional code pattern are preferably each only applied along the scanning direction. This means that one-dimensional code patterns in their actual sense are preferred. The scanning direction of a one-dimensional code pattern is generally to be understood as that direction along which the degree of reflection or degree of remission of the ground changes.

It is preferred that the angular offset corresponds to a full angle divided by the number of the at least two one-dimensional code patterns. The scanning directions predefined by the individual code patterns are therefore preferably aligned distributed evenly. This has the advantage that the angular regions that are not covered by any scanning direction are kept as small as possible.

On the presence of only two code patterns per marking element, provision can, however, also be made that the scanning directions are offset by approximately 90° with respect to one another. It has been found that two code patterns per marking element are in particular sufficient with the support of corresponding evaluation algorithms to enable a reliable reading of the navigation information on an approach from any desired direction.

In accordance with an embodiment of the invention, each of the marking elements has at least four one-dimensional graphical code patterns whose scanning directions are each offset with respect to one another by the same angular offset. This has proved to be particularly favorable with respect to the required processing effort. A specific embodiment of the invention provides that each of the marking elements has exactly four one-dimensional graphical code patterns whose scanning directions are each aligned offset from one another by an angular offset of 90 degrees.

A further embodiment of the invention provides that a piece of positional information and a piece of directional information are respectively encoded in the code patterns, with the positional information indicating the position of the respective marking element within a grid-like arrangement of marking elements and the directional information indicating the orientation of the scanning direction of the respective code pattern or of a reference direction in a fixed relationship therewith relative to a spatially fixed reference axis, in an operating state of the navigation system in accordance with its intended purpose. The evaluation unit can recognize with reference to the directional information from which direction the respective marking element is being traveled to and in which direction it has to continue to travel. In a particularly simple embodiment, cardinal points are encoded in the code patterns.

The sensor device can be configured to recognize a deviation of the scanning direction of a code pattern from an instantaneous scanning direction of the sensor device on a travel to a marking element by the automated guided vehicle, with the evaluation device being configured to trigger a correction travel of the automated guided vehicle with reference to a recognized deviation, said correction travel acting against the deviation. Such a correction travel can be carried out simply and fast. After a corresponding new alignment of the sensor device, the respective code pattern and/or a further code pattern of the marking element can be reliably recognized. The term "correction travel" should not only cover a maneuvering, but also an aligning movement of the automated guided vehicle. Instead of a correction travel, a correcting adjustment of the sensor device could generally also be carried out.

A preferred embodiment of the invention provides that the one-dimensional code patterns are designed as barcodes and that the sensor device comprises a barcode reader. The barcode reader can in particular be designed as a laser scanner. Barcode readers are produced in large volumes for a variety of applications and are accordingly inexpensively available.

In accordance with a further embodiment of the invention, at least some of the one-dimensional code patterns are arranged on a circle line. This facilitates a code pattern recognition with any desired direction of travel. The one-dimensional code patterns can in particular be arranged evenly distributed over the periphery of the circle line.

The one-dimensional code patterns can comprise a first set of code patterns and a second set of code patterns, with the code patterns of the first set being arranged on an inner circle line and the code patterns of the second set being arranged on an outer circle line, preferably such that the number of code patterns of the first set is smaller than the number of code patterns of the second set. The code patterns of the second set can be used to determine the alignment of the sensor device relative to the marking element. The navigation information can then be read from a code pattern of the first set, optionally after a correction travel as described above.

The marking elements can each have a center mark to enable an exact positioning of the automated guided vehicle relative to the marking element and/or to enable an improved signal evaluation. A simple cross can in particular be provided as the center mark.

At least one guide symbol that marks a distance of a measurement point from the center of the marking element can be associated with the center mark. Such a guide symbol enables a guidance of the sensor device toward the center of the marking element. For example, a wedge-shaped guide symbol can be provided that faces into the center of the marking element.

The marking elements can be designed as stickers onto which the graphical code patterns are printed. This enables a simple and fast production that can optionally be carried out on site by means of a commercial printer. This means that an existing activity zone can be expanded in a simple and fast manner.

In the event of an only partially recognized code pattern, the evaluation device can be configured to trigger a correction travel of the automated guided vehicle and/or to automatically supplement the non-recognized portion by means of a reconstruction algorithm. The reliability of the navigation system is hereby improved.

The invention also relates to a marking element for a navigation system, in particular for a navigation system as described above, having a lower side formed for fastening to the floor and an upper side onto which a position mark is applied.

Provision is made in accordance with the invention that the position mark has at least two graphical code patterns that are each designed as one-dimensional code patterns and comprise a code applied along a scanning direction, with the scanning directions of the at least two graphical code patterns being aligned offset from one another by an angular offset. A corresponding marking element enables the use of a simple and inexpensive barcode reader for determining the position mark.

The invention further relates to an automated guided vehicle system having a navigation system configured as described above.

Further developments of the invention are also set forth in the dependent claims, in the description and in the enclosed drawings.

The invention will be explained by way of example in the following with reference to the drawings.

Figure 1:
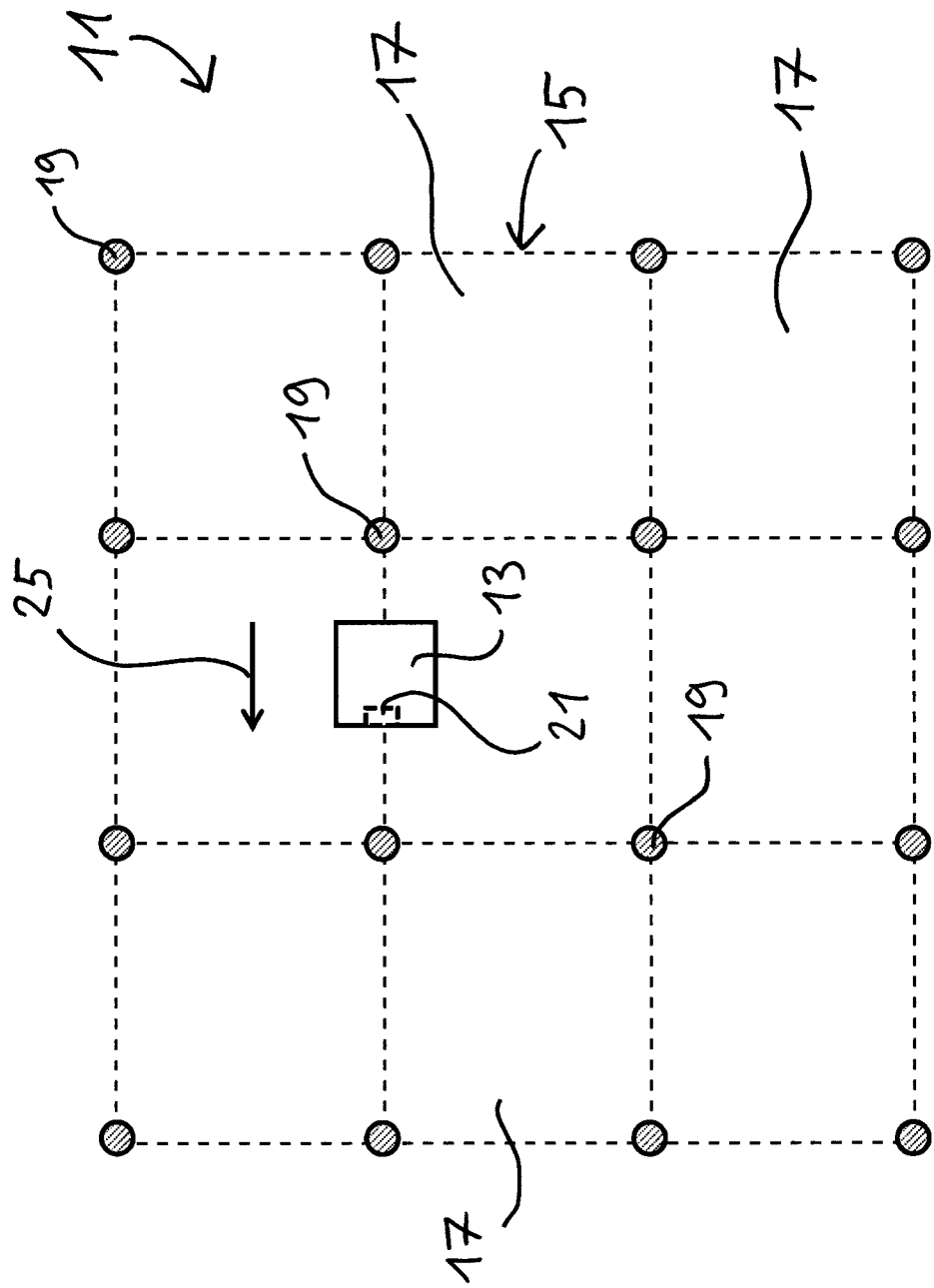
FIG. 1 is a simplified plan view of a navigation system in accordance with the invention for an automated guided vehicle.

The navigation system 11 shown in FIG. 1 serves to automatically guide an automated guided vehicle 13 to a predefined destination in a limited activity zone 15 such as a warehouse The activity zone 15 is divided for this purpose in a grid-like manner into mutually adjacent, for example square, individual regions 17, with respective marking elements 19 being arranged in the corners of the individual regions 17. The marking elements 19 bear respective position marks that are recognized by a sensor device 21 attached to the automated guided vehicle 13 and only shown schematically in FIG. 1. An evaluation unit connected to the sensor device 21 and not shown provides in a generally known manner that the automated guided vehicle 13 travels to predefined positions of the activity zone 15 to, for example, place or pick products or components. An instantaneous direction of travel 25 of the automated guided vehicle 13 is indicated by an arrow in FIG. 1.

Figure 2:
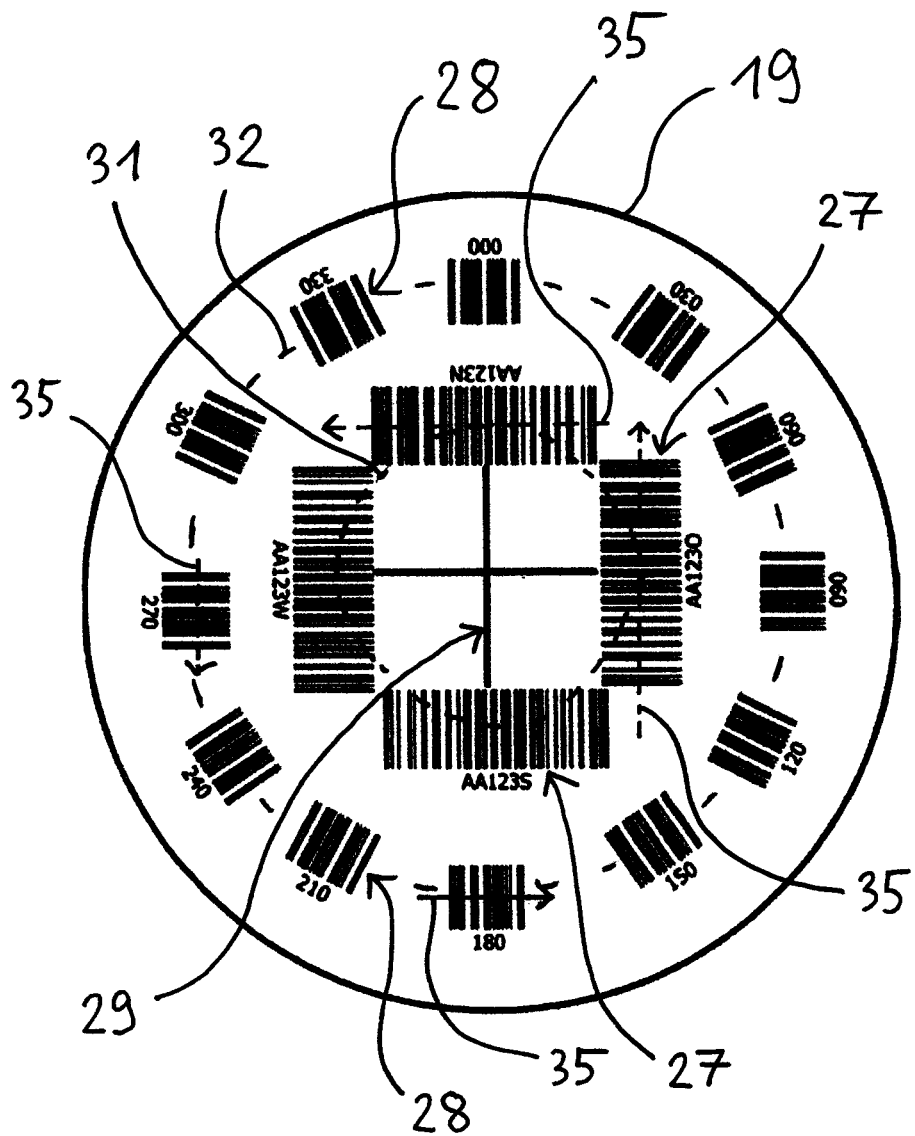
FIG. 2 shows a marking element of the navigation system in accordance with FIG. 1 designed in accordance with a first embodiment of the invention.

FIG. 2 shows one of the marking elements 19 that is designed in accordance with a first embodiment of the invention. It is designed as a sticker for sticking to the floor and comprises a first, inner set of graphical code patterns 27, a second, outer set of graphical code patterns 28, and a cruciform center mark 29. The graphical code patterns 27, 28 and the center mark 29 are each printed onto the marking element 19. The diameter of a marking element 19 preferably amounts to at least 30 mm and at most 200 mm.

The code patterns 27 of the inner set are arranged on an inner circle line 31 shown dashed for clarification, while the code patterns 28 of the outer set are arranged on an outer circle line 32 concentric to the inner circle line 31. All the code patterns 27, 28 are designed as one-dimensional barcodes. This means that every code pattern 27, 28 defines an individual scanning direction 35 along which the code is applied. The sensor device 21 (FIG. 1) is accordingly designed as a one-dimensional code reader, preferably as a barcode reader.

As shown, the code patterns 27, 28 of each set are arranged such that the scanning directions 35 are aligned offset from one another by an angular offset. Specifically, the scanning directions 35 in the embodiment shown each face in the peripheral direction of the respective circle line 31, 32. The code patterns 27, 28 of each set are furthermore distributed evenly over the respective circle line 31, 32.

A piece of positional information and a piece of directional information are encoded in each of the code patterns 27, 28. In the operating state of the navigation system 11 in accordance with its intended purpose shown in FIG. 1, the positional information indicates the position of the respective marking element 19 within the activity zone 15, while the directional information indicates the orientation of the scanning direction of the respective code pattern or of a reference direction in a fixed relationship therewith relative to a spatially fixed reference axis. The cardinal point is indicated as directional information in the code patterns 27 of the inner set, whereas the angle is indicated in the code patterns 28 of the outer set. The positional information is at least the same for all the code patterns 27 of the inner set and is characteristic for the respective marking element 19.

If the automated guided vehicle 13 approaches a marking element 19 from any desired direction, the sensor device 21 reads that one of the outer code patterns 28 that is recognized first or whose scanning direction 35 coincides best with the scanning direction of the sensor device 21. The evaluation device can recognize with reference to the read directional information the direction from which the respective marking element 19 is traveled to and how the automated guided vehicle 13 has to be positioned so that the positional information of one of the code patterns 27 of the inner set can be read as well as possible. This is the case when the scanning direction 35 of the respective code pattern 27 deviates as little as possible from the scanning direction of the sensor device 21. The center mark 29 is used in addition to the alignment of the automated guided vehicle 13. The evaluation device can control the continued travel of the automated guided vehicle 13 in a generally known manner with reference to the read positional information.

Figure 3:
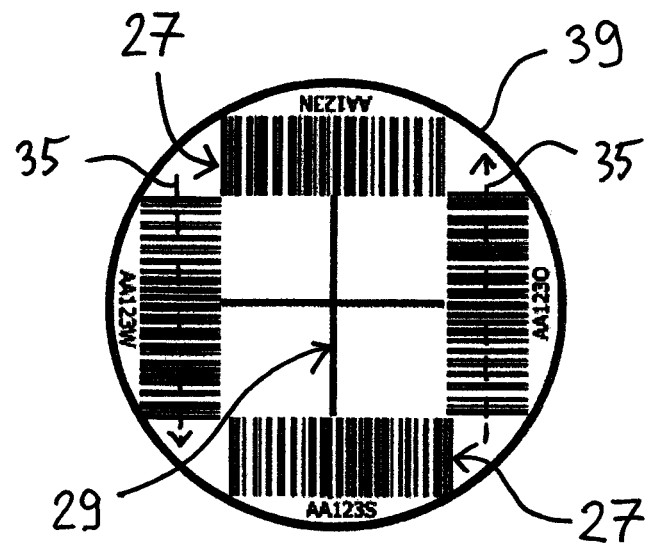
FIG. 3 shows a marking element of the navigation system in accordance with FIG. 1 designed in accordance with a second embodiment of the invention.

A simplified variant of a marking element 39 in accordance with the invention is shown in FIG. 3. The outer set of code patterns is omitted here; this means that the marking element 39 only comprises four code patterns 27 whose scanning directions 35 are each arranged offset from one another by 90°. It has been shown that in particular with an expanded function of the sensor device 21 and/or of the evaluation device, four code patterns 27 are sufficient in order also to enable a correct reading under unfavorable conditions such as a sloped travel. The evaluation device can in particular be configured to perform a partial code recognition and optionally to reconstruct the complete barcode from the recognized partial pieces by means of a code reconstruction algorithm. A center mark 29 is likewise provided in the variant shown in FIG. 3.

Figure 4:
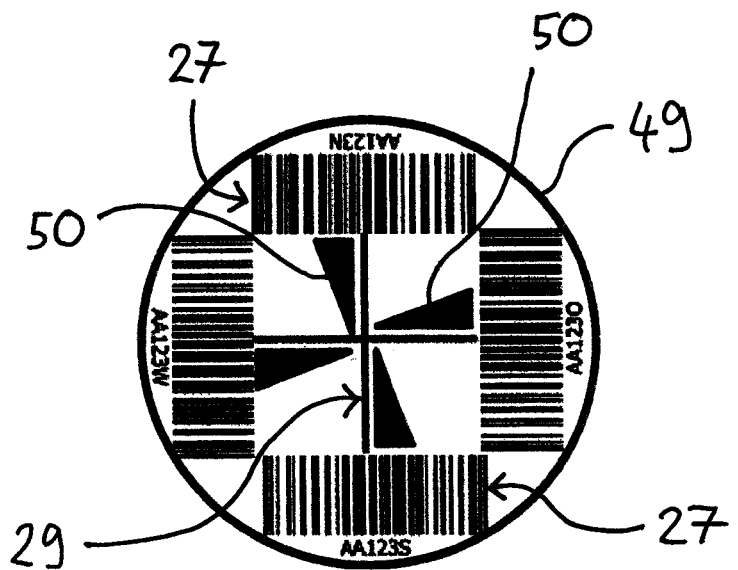
FIG. 4 shows a marking element of the navigation system in accordance with FIG. 1 designed in accordance with a third embodiment of the invention.

The further embodiment of a marking element 49 in accordance with the invention shown in FIG. 4 is of a similar design to the embodiment shown in FIG. 3, but additionally has an arrangement of four wedge-shaped guide symbols 50 that facilitate the localizing of the center of the marking element 49 while using the center mark 29.

Since the automated guided vehicle 13 only has to be equipped with a simple barcode reader and not, for instance, with a matrix code reader or the like, and since no complex and/or expensive work additionally has to be carried out to fasten the marking elements 19, 39, 49 to the floor, a navigation system 11 in accordance with the invention can be manufactured particularly inexpensively.

REFERENCE NUMERAL LIST

11 navigation system
13 automated guided vehicle
15 activity zone
17 individual region
19 marking element
21 sensor device
25 direction of travel
27 code patterns of the inner set of code patterns
28 code patterns of the outer set of code patterns
29 center mark
31 inner circle line
32 outer circle line
35 scanning direction
39 marking element
49 marking element
50 guide symbol

The invention claimed is:

1. A navigation system for an automated guided vehicle, the navigation system comprising: a set of marking elements which are to be arranged in a grid-like manner on a floor and in which navigation information is encoded;
   a sensor device to be arranged at the automated guided vehicle for reading navigation information from the marking elements; and
   an evaluation device connected to the sensor device for generating control signals for the automated guided vehicle with reference to read navigation information, wherein each of the marking elements has at least two graphical code elements that are each designed as one-dimensional code patterns and that comprise a code applied along a scanning direction, with the scanning directions of the at least two graphical code patterns being aligned offset from one another by an angular offset, wherein a piece of positional information and a piece of directional information are encoded in each of the code patterns, with the positional information indicating the position of the respective marking element within a grid-like arrangement of marking elements and the directional information indicating the orientation of the scanning direction of the respective code pattern or of a reference direction in a fixed relationship therewith relative to a spatially fixed reference axis, in an operating state of the navigation system in accordance with its intended purpose.

2. The navigation system in accordance with claim 1, wherein the codes of the one-dimensional code patterns are each applied only along the scanning direction.

3. The navigation system in accordance with claim 1, wherein the angular offset corresponds to a full angle divided by the number of the at least two one-dimensional code patterns.

4. The navigation system in accordance with claim 1, wherein each of the marking elements has at least four one-dimensional graphical code patterns whose scanning directions are each aligned offset from one another by the same angular offset.

5. The navigation system in accordance with claim 1, wherein the sensor device is configured to recognize a deviation of the scanning direction of a code pattern from an instantaneous scanning direction of the sensor device on a travel to a marking element by the automated guided vehicle; and wherein the evaluation device is configured to trigger a correction travel of the automated guided vehicle with reference to a recognized deviation, said correction travel acting against the deviation.

6. The navigation system in accordance with claim 1, wherein the one-dimensional code patterns are designed as barcodes; and wherein the sensor device comprises a barcode reader.

7. The navigation system in accordance with claim 1, wherein at least some of the one-dimensional code patterns are arranged on a circle line.

8. The navigation system in accordance with claim 7, wherein the one-dimensional code patterns comprise a first set of code patterns and a second set of code patterns, with the code patterns of the first set being arranged on an inner circle line and the code patterns of the second set being arranged on an outer circle line.

9. The navigation system in accordance with claim 8, wherein the code patterns of the first set are arranged on the inner circle line and the code patterns of the second set are arranged on the outer circle line such that the number of code patterns of the first set is smaller than the number of code patterns of the second set.

10. The navigation system in accordance with claim 1, wherein the marking elements each have a center mark.

11. The navigation system in accordance with claim 10, wherein at least one guide symbol that marks a distance of a measurement point from the center of the marking element is associated with the center mark.

12. The navigation system in accordance with claim 1, wherein the marking elements are designed as stickers onto which the graphical code patterns are printed.

13. The navigation system in accordance with claim 1, wherein, in the event of an only partially recognized code pattern, the evaluation device is configured to trigger a correction travel of the automated guided vehicle with reference to the recognized portion and/or to automatically supplement the non-recognized portion by means of a reconstruction algorithm.

14. A marking element for a navigation system, the marking element having a lower side formed for fastening to a floor and having an upper side onto which a position marking is applied, wherein the position mark has at least two graphical code patterns that are each designed as one-dimensional code patterns and comprise a code applied along a scanning direction, with the scanning directions of the at least two graphical code patterns being aligned offset from one another by an angular offset, wherein at least some of the one-dimensional code patterns are arranged on a circle line and wherein the one-dimensional code patterns comprise a first set of code patterns and a second set of code patterns, with the code patterns of the first set being arranged on an inner circle line and the code patterns of the second set being arranged on an outer circle line.

15. The marking element of claim 14, wherein the navigation system comprises: a set of marking elements which are to be arranged in a grid-like manner on the floor and in which navigation information is encoded;
a sensor device to be arranged at the automated guided vehicle for reading navigation information from the marking elements; and
an evaluation device connected to the sensor device for generating control signals for the automated guided vehicle with reference to read navigation information, wherein each of the marking elements has at least two graphical code elements that are each designed as one-dimensional code patterns and that comprise a code applied along a scanning direction, with the scanning directions of the at least two graphical code patterns being aligned offset from one another by an angular offset.

16. A navigation system for an automated guided vehicle, the navigation system comprising: a set of marking elements which are to be arranged in a grid-like manner on a floor and in which navigation information is encoded;
a sensor device to be arranged at the automated guided vehicle for reading navigation information from the marking elements; and
an evaluation device connected to the sensor device for generating control signals for the automated guided vehicle with reference to read navigation information, wherein each of the marking elements has at least two graphical code elements that are each designed as one-dimensional code patterns and that comprise a code applied along a scanning direction, with the scanning directions of the at least two graphical code patterns being aligned offset from one another by an angular offset, wherein at least some of the one-dimensional code patterns are arranged on a circle line and wherein the one-dimensional code patterns comprise a first set of code patterns and a second set of code patterns, with the code patterns of the first set being arranged on an inner circle line and the code patterns of the second set being arranged on an outer circle line.

* * * * *